United States Patent Office.

WILLIAM T. TIBBALS AND LYMAN B. TIBBALS, OF COBALT, CONNECTICUT.

Letters Patent No. 94,453, dated August 31, 1869.

IMPROVEMENT IN THE MANUFACTURE OF COW-BELLS.

The Schedule referred to in these Letters Patent and making part of the same

*To all whom it may concern:*

Be it known that we, WILLIAM T. TIBBALS and LYMAN B. TIBBALS, of Cobalt, county of Middlesex, and State of Connecticut, have invented certain new and useful Improvements in the Process of Manufacturing Cow-Bells; and to enable others skilled in the art to make and practise the same, we will proceed to describe it.

The nature of this invention consists in making the body of the bell in the common way, and then, by the process of galvanizing, both coat its entire surface, and solder or unite the lap-joints.

To be more particular, we first prepare the metal, and form and rivet it into shape substantially in the same manner which has been long practised in the manufacture of cow-bells. But in order to solder or unite the edges, after they have been riveted, either before or after the strap-loop and tongue-staple are secured to the bell, we subject them to galvanic action, which produces, at one and the same time, the double object of coating the bell-surface, to prevent oxidation, and solder or unite the lap-edges of the metal with the coating material, thereby securing a bell fully equal or better, and much cheaper than those heretofore made.

By this improvement we are enabled to avoid the old irksome way of brazing the joints, and render the work pleasant and easy to perform, and produce a cheaper and better article for use and trade.

What we claim, and desire to secure by Letters Patent, is—

The process of uniting or soldering the joints, while in the act of coating, or galvanizing the bell, substantially as and for the purpose described.

WILLIAM T. TIBBALS. [L. S.]
LYMAN B. TIBBALS. [L. S.]

Witnesses:
R. T. SPERRY,
JEREMY W. BLISS.